Oct. 26, 1943.                    R. G. OLT                    2,332,746
                       METHOD OF MAKING POROUS METAL
              Filed Sept. 3, 1940            2 Sheets-Sheet 2
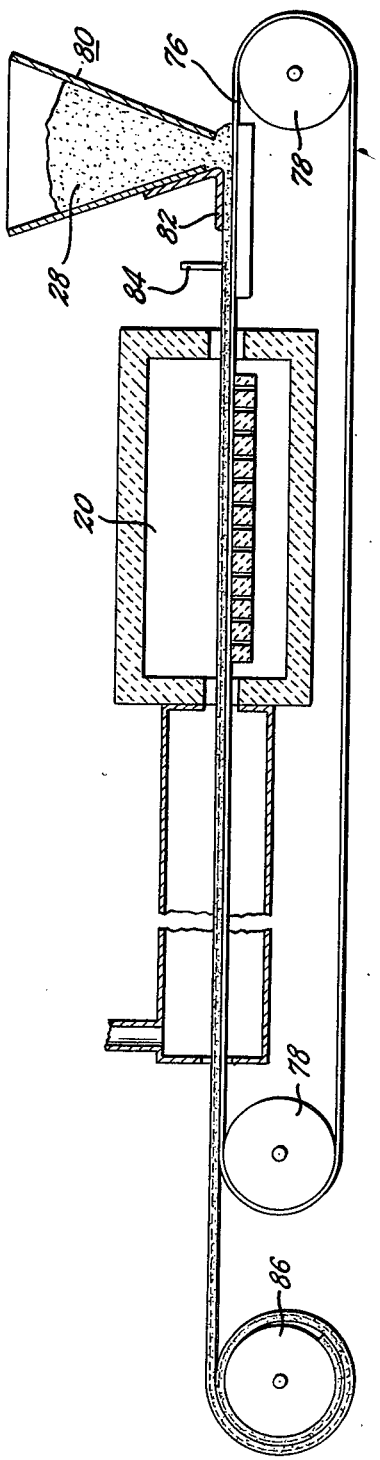
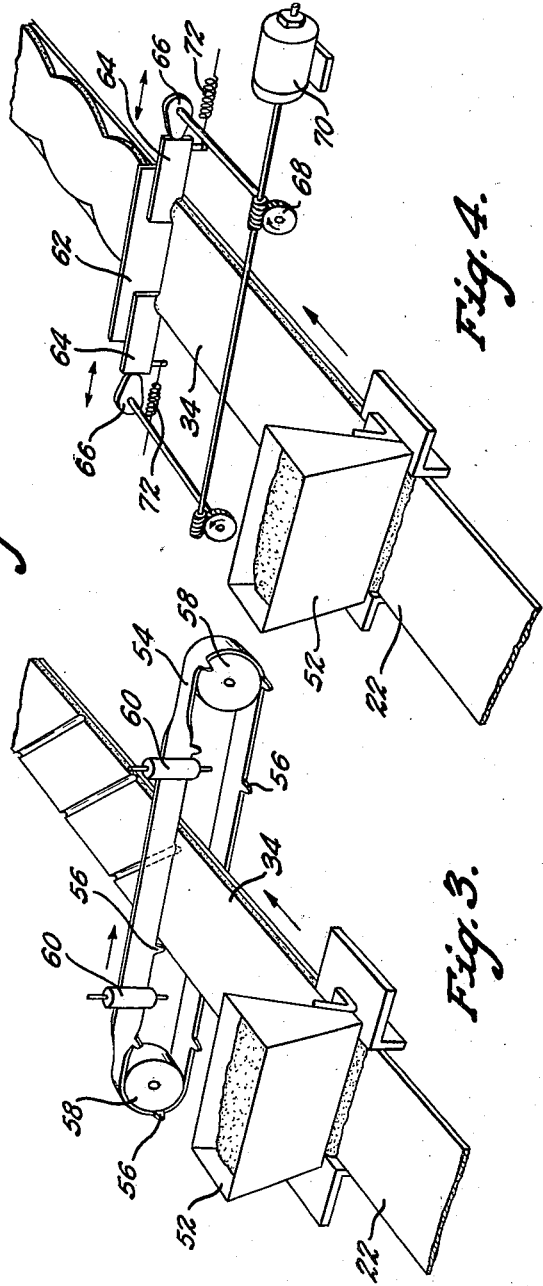
INVENTOR
Richard G. Olt
BY
his ATTORNEYS Patented Oct. 26, 1943

2,332,746

UNITED STATES PATENT OFFICE 2,332,746

METHOD OF MAKING POROUS METAL

Richard G. Olt, Dayton, Ohio, assignor to General Motors Corporation, Detroit, Mich., a corporation of Delaware Application September 3, 1940, Serial No. 355,148

6 Claims. (Cl. 29—189)

The present invention is directed to a porous material and novel porous strip material and is particularly directed to a method for making such material.

An object of the invention is to provide a method for continuously forming a groove in composite strip material which comprises a porous metal layer bonded to a more dense metal supporting back.

In carrying out the above object it is a further object to form the groove in a powdered metal layer on said steel strip or back prior to the sintering step used to form the porous metal layer whereby the groove remains in the porous metal layer upon completion of the operations thereon.

It is a still further object of the invention to provide various shaped grooves some of which are discontinuous in character and comprise angular grooves across the porous layer while other grooves are of the continuous nature.

Another object of the invention is to form grooves in layers of porous metal which are not bonded to steel backs or the like.

A still further object is to provide a method for providing grooves in porous metal layers wherein the porosity of the metal in and adjacent the groove is substantially the same as the porosity of the remainder of the layer.

Another object is to provide a grooved porous metal part wherein the porosity throughout is substantially uniform.

A further object is to provide a method for continuously forming articles of similar shape from a metal powder layer wherein the articles may be attached to one another after sintering by a neck of weakened material which is easily broken or wherein separate articles may be formed as desired.

Further objects and advantages of the present invention will be apparent from the following description, reference being had to the accompanying drawings wherein a preferred embodiment of the present invention is clearly shown.

In the drawings:

Fig. 2 is a view in cross section showing means of grooving a porous metal layer which is not bonded to steel strips.

Fig. 3 is a fragmentary view showing an apparatus which may be used in connection with the apparatus shown in either Fig. 1 or Fig. 2 for forming grooves in the powder metal layer.

Fig. 4 is a fragmentary view in perspective showing still another form of apparatus for grooving metal layers.

Figure 1:
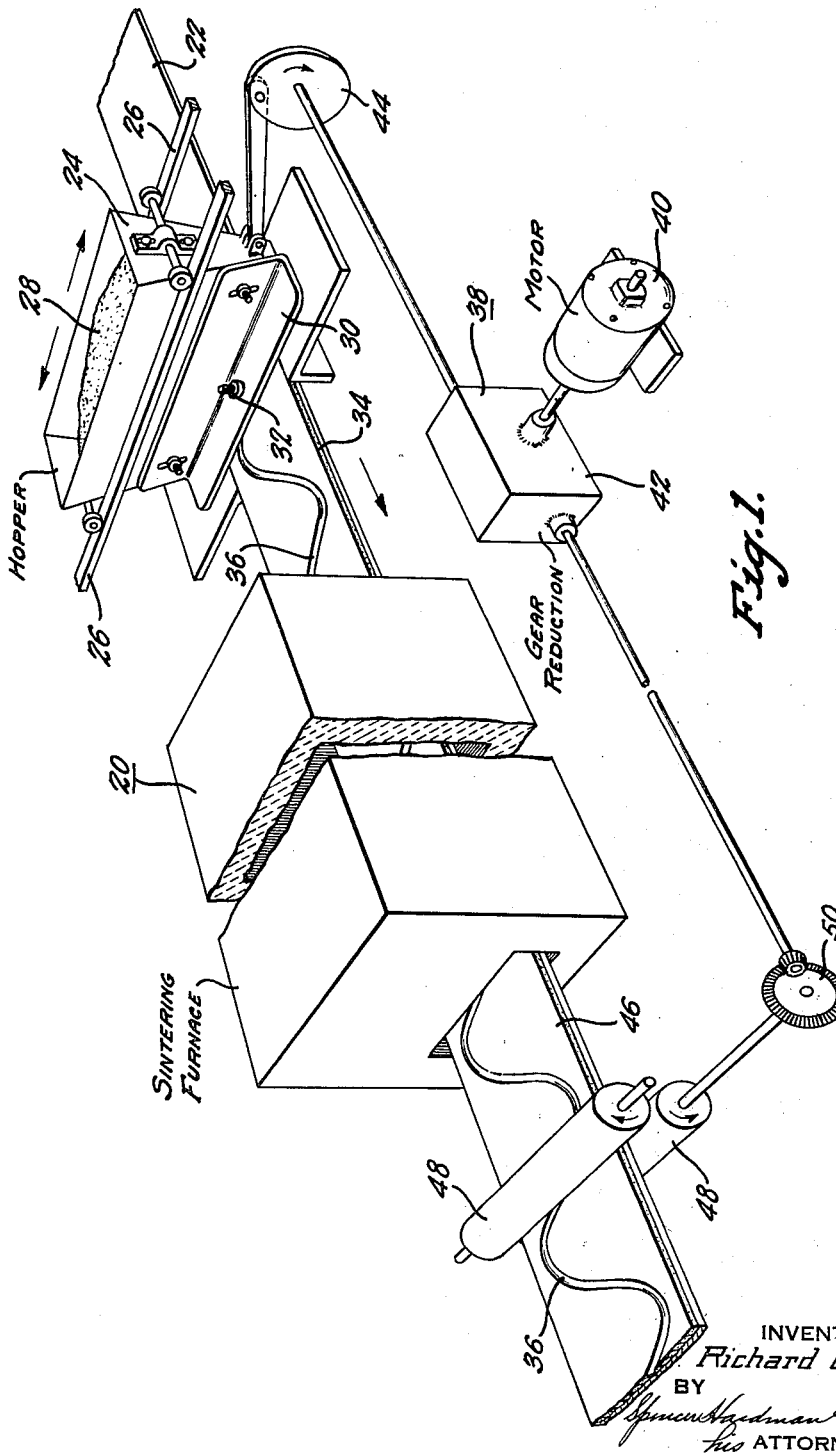
Fig. 1 is a view of the sectional diagrammatic view in perspective of one type of apparatus used to provide a groove in a porous metal layer of composite strip material.

In forming composite strip stock, as is disclosed in patents, Nos. 2,198,253 and 2,198,254, both assigned to the assignee of the present invention, it is desirable when the material is finally cut into blanks for bearings or the like to have oil grooves in the porous metal layer. Heretofore these grooves have been formed by a subsequent pressing operation after the blanks have been cut or by machining the groove directly into the blank whereby the porosity of the groove is lower than the porosity of the remainder of the layer. The present invention is directed to a continuous method of grooving the porous metal layers during the manufacture thereof whereby blanks may be cut from the strips which are suitably grooved thereby eliminating one of the production steps necessary in the manufacture of the many types of bearings.

Referring particularly to Fig. 1, 20 indicates a sintering furnace which has a metal strip 22 passing therethrough in the direction of the arrows in the drawings. Strip 22 is preferably of steel, iron or nickel which may be copper plated, if desired. The strip 22 is passed beneath a hopper 24 which is movably mounted on a pair of tracks 26. The hopper 24 is adjustably set the desired distance above the surface of strip 22 so that metal power 28 placed therein will fall by gravity through the restricted opening at the bottom thereof onto the strip 22 as the strip passes beneath the hopper. The powder is smoothed into a layer 34 of the desired thickness by means of a smoothing device 30 attached to the hopper. In the present instance a lug 32 is provided on the smoothing device. The lug 32 is dragged through the powdered metal and is adapted for any desired depth thereby removing a desired portion of the metal powder from the layer 34 to form a groove 36 therein. In order to have the groove of the desired configuration, the hopper is made to reciprocate on track 26 in the direction of the arrows through suitable driving means 38 which include a motor 40, a speed reducer 42 and a rotatable driving connection 44. In this manner the hopper 24 is reciprocated in opposite directions across the strip while the strip is moved in the direction perpendicular to the direction of reciprocation whereby the lug 32 gouges a sinuous path in the powdered metal layer. The strip 22 with the layer 34 thereon next passes into furnace 20 where it is sintered under suitable conditions to cause the metal powder layer to sinter together in a strong porous metal layer and simultaneously bond in situ to the steel back 22 and form a composite strip 46. The strip may be subsequently rolled by rolls 48 which are preferably driven from the speed reducer 42 through gear 50. The strip 22 is next cut into desirable lengths whereby the groove 36 which is now formed in the porous metal layer terminates adjacent the edge of each blank which permits induction of oil to the bearing surface when the blanks are formed and are in use.

Fig. 3 shows another type of grooving mechanism wherein the hopper 52 is stationary and wherein the grooving means comprises a belt 54 rotatable in a path perpendicular to the direction of travel of the strip 22, which belt carries a series of projections 56 thereon that are normally not in a plane perpendicular to the surface of strip 22. Upon passing over roller 58 which supports the belt and drives the same, two rollers 60 are provided for changing the plane of the belt whereby the belt is made perpendicular to the plane of the strip. In this manner the projections 56 are dragged across the strip and through the powdered metal layer 34 thereon while the strip moves in a direction perpendicular to the direction of travel of projection 56 for forming angular grooves 60 at spaced distances in the powdered metal layer. The number of grooves, angle, and spacing thereof may be regulated by the speed of belt 54, spacing of said projections 56 and/or speed of strip 22 as desired. By adjustment of the angularity of the belt 54 relative to the line of travel of the strip the angularity of the grooves may be controlled, it even being possible to make the grooves at 90° to the edge of the strip if desired.

Fig. 4 shows still another type of groove-forming apparatus wherein the strip 22 passes under a suitable hopper 52 and then a scraper 62 is provided which is set a spaced distance above the strip 22 to level off the powdered metal layer 34 thereon. Just behind scraper 62 are two movable scrapers 64 which are reciprocated toward one another by means of cam 66 driven by suitable speed reducing mechanism 68 and motor 70. The cam 66 causes the scrapers 64 to be pressed inwardly while springs 72 draw the scrapers outwardly whereby a scalloped edge is formed in the powdered metal layer. Obviously a single scraper may be provided at 64, and only one edge scalloped as desired. Also, by changing the configuration of cam 66 the scallop design may be altered.

In some cases it is desirable to provide grooves or scallops in porous metal layers which are not bonded to steel backs or other supporting material in which instance the apparatus, as shown in Fig. 2, is proposed wherein an endless stainless steel belt 76, which rotates around suitable rollers 78, is provided. Belt 76 is high in chromium content and when oxidized does not stick to the porous metal. Also plates of graphite may be used which are placed on the belt if desired. A hopper 80 is provided which is filled with powdered metal 28 and a smoothing device 82 with suitable lugs 84 is likewise provided. In this manner the hopper and/or the lugs 84 may be reciprocated in any other manner, as noted in Figs. 1, 3 or 4, across the porous metal layer. Obviously since there is no supporting back, the groove can not be cut completely through the porous metal layer if a continuous layer is desired but in the preferred form extends only partially through the cross section thereof whereby the entire layer is held together. It is possible, however, if small plates of various shapes are desired, to have the lugs scrape completely through to the belt 76 to form a plurality of similarly shaped objects upon the belt 76. Belt 76 with the powdered metal layer thereon next passes into a sintering furnace 20 where the layer is sintered to form strong porous metal object or a continuous length of porous metal which has suitable grooves therein. After emerging from the furnace the porous metal may be operated upon as desired since it does not adhere to the stainless steel belt 76.

In place of the stainless steel belt 76 a nickel steel belt or any other heat resisting steel belt may be used where graphite is dusted thereon prior to the distribution of the metal. The graphite prevents the porous metal from adhering to the steel, likewise, Alundum dust may be used, either expedient being well known in the art.

It is to be understood that when the word "groove" is utilized herein that such term includes scalloped edges, grooves or other configurations in powdered metal layers, the word being used in the general sense to include any type of form operation of metal layers as explained herein.

From the foregoing it will be noted that I have provided a simple method of grooving or shaping porous metal layers in a continuous manner when said layers are made from non-compacted metal powder, said grooving taking place simultaneously with the leveling operation.

It is manifest also that the present method may be utilized in an intermittent process wherein articles may be formed which are of a composite nature wherein blanks of steel are placed in a continuous belt and wherein metal powder is smoothed and grooved simultaneously thereon.

While the embodiment of the present invention as herein disclosed, constitutes a preferred form, it is to be understood that other forms might be adopted, all coming within the scope of the claims which follow.

What is claimed is as follows:

1. In a method of distributing loose non-compacted metal powders upon metallic strip material and simultaneously grooving the metal powder to the desired configuration on said strip which comprises, distributing a layer of loose non-compacted metal powder upon the surface of a metallic strip, then scraping the metal powder layer with a scraper set to the desired distance above said strip to provide a smooth layer of a desired thickness of metal powder thereon and simultaneously removing a portion of the powder in a selected area only by means of a projection associated with said scraper whereby a groove is formed in the metal powder layer.

2. In a method of making composite bearing blanks for subsequent use with bearings where a layer of porous metal is bonded to a strong steel backed material, said porous metal layer including an oil groove therein, which comprises continuously applying metal powder progressively to form a single layer on the surface of the steel strip material, scraping the metal powder by means of a suitable scraper set a definite distance above the surface of the steel strip into a layer of uniform thickness and simultaneously removing a portion of the metal powder on said strip to form a groove in the metal powder layer, then continuously sintering the metal powder layer on said strip whereby the metal powder sinters together into a porous metal layer and the layer is simultaneously bonded to the steel back material in situ, and then cutting the strip into suitable length blanks whereby the groove formed during the scraping step is located in the same position on each blank cut.

3. In the method as claimed in claim 2 wherein the groove is formed angularly across the powdered metal layer.

4. In a method as claimed in claim 2, wherein the groove comprises a continuous sinuous path in the powdered metal layer.

5. In a method of making articles of porous metal, the steps comprising, continuously distributing a loose, non-compacted layer of metal powder upon a supporting surface continuously smoothing said layer of metal powder into a layer of substantially uniform thickness and density, removing selected portions only of the metal powder to divide said smoothed layer into a plurality of separate sections, and then sintering said separated sections under suitable conditions of time, temperature and atmosphere to form a plurality of articles.

6. In a method of continuously making porous metal strip stock having a groove therein, the steps of continuously distributing a loose, non-compacted layer of metal powder upon a supporting surface, continuously smoothing said layer by means of a smoothing device into a layer of uniform thickness, removing a portion of said smoothed layer, to form a lubricating groove therein and then sintering the layer so formed under suitable conditions of time, temperature and atmosphere.

RICHARD G. OLT.